Oct. 20, 1936.  W. F. CHESLEY  2,058,298

JIG BUSHING

Filed April 25, 1935

INVENTOR
Willis F. Chesley
BY Thomas F. Scofield
ATTORNEY

Patented Oct. 20, 1936

2,058,298

UNITED STATES PATENT OFFICE 2,058,298

JIG BUSHING

Willis F. Chesley, Grandview, Mo.

Application April 25, 1935, Serial No. 18,134

3 Claims. (Cl. 77—62)

My invention relates to jigs or templates and more particularly to a drilling or reaming jig.

It is common practice in machine shops and factories where work is being performed which requires the drilling or reaming of a number of holes in steel or other metals in predetermined positions, to be performed repeatedly, to employ a template or jig in which guide holes are placed at the predetermined positions for the drills or reamers used. The use of jigs in duplicate work eliminates laying out each piece of work separately. Drills tend to "run" or "creep". This is caused by a hard spot in the work or asymmetric sharpening of the drill. In reaming, which is resorted to for enlarging a hole to a desired diameter, it may happen that the reamer may be slightly eccentric to the sub-hole being reamed. This results in inaccuracy. The use of jigs prevents the running or creeping of drills and makes for greater accuracy. Likewise, because of the use of jigs, drilling may be undertaken with greater speed without danger of sacrificing accuracy.

For a given jig or template, it has been the practice to use hardened steel bushings to take the wear occasioned by drilling with the jig. When the bushings wear, they must be replaced in order to maintain accuracy in the work. The wearing of bushings allows a slight angularity of the drill which tends to injure the drill. With stationary or pressed in bushings, a degree of clearance must be allowed which, in turn, makes for a slight inaccuracy in the work.

The use of stationary bushings, besides entailing the disadvantages pointed out above, requires that they be frequently replaced. This not only slows the work but is an item of expense. Then, too, wear in the bushings may not be noticed until it is discovered that inaccuracy in the work exists.

One object of my invention is to provide a jig or template provided with guide bushings for a drill or reamer which will maintain their accuracy by eliminating wear.

Another object of my invention is to provide a jig or template with a movably mounted bushing which may be lubricated.

Another object of my invention is to provide a jig or template provided with a bushing which may be fitted to a drill with a minimum clearance, thus making for greater accuracy in work.

Another object of my invention is to provide a jig or template provided with a wear resisting bushing which will preclude injury to the drill or reamer.

Other and further objects of my invention will appear from the following description.

In the accompanying drawing which forms part of the instant specification and is to be read in conjunction therewith and in which like reference numerals are used to indicate like parts in the various views.

Figure 1:
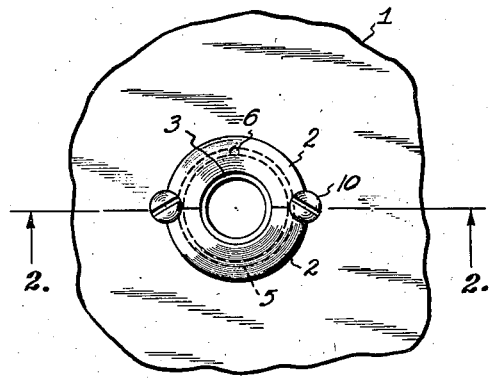
Figure 1 is a plan view of a portion of a jig or template of any suitable design fitted with a jig bushing, according to one embodiment of my invention.

In general, my invention contemplates the provision of a hardened steel bushing whose internal diameter is closely that of the diameter of the drill or reamer to be used with sufficient clearance to allow its insertion through the bushing. The bushing is mounted in the jig or template by means of a collar in which the bushing is free to rotate. The collar may be made of bronze or other suitable bearing metal and provided with a lubricating groove. If desired, a suitable bearing such as a ball or roller bearing may be used to rotatably support the guide bushing for the drill or reamer.

More particularly referring now to the drawing, a jig or template 1, which may be of any suitable design or shape, is provided with a hole in which is seated a pair of semi-circular members 2 which, when assembled, form a collar. The members 2 may be made of bronze, lead-bronze alloy, or any other suitable material. The collar members 2 are adapted to house a steel guide bushing 3 which is made of hardened steel. The collar members 2 are provided with flanges 4 which are adapted to retain the bushing against movement along the axis of the hole. The interior walls of the collar members are provided with a suitable oiling groove 5, access to which is had by means of duct 6 through which oil or other suitable lubricant may be passed.

At the junction of the two collar members 2, peripherally thereof, and the hole, I tap a screw thread 7 and drill a small circular recess 8. Into the opening thus formed I screw machine screws 9 with their heads 10 seated in the recess 8. The screw threads prevent motion along the axis of the drill hole, while the slots of the screw, seated in the recess, prevent rotation of the collar members.

In operation, the drill 11 passes through the bushing 3 and is guided thereby to drill through the plate 12, which represents the work in which the holes are to be drilled. The guide bushing 3 is adapted to rotate freely in the bearing formed by collar members 2. It will be seen that the friction on bushing 3 will be substantially only that of movement of the drill axially thereof. Rotary friction is substantially eliminated and the bushing 3 is free to turn in its bearing as soon as the friction of turning is minimized by lubrication which will be substantially negligible.

Figure 2:
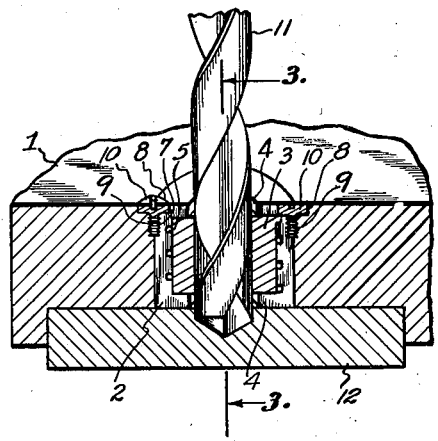
Figure 2 is a sectional view taken on line 2—2 of Figure 1.
Figure 3:
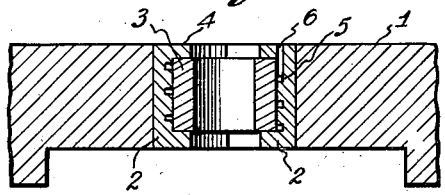
Figure 3 is a sectional view taken on line 3—3 of Figure 2.
Figure 4:
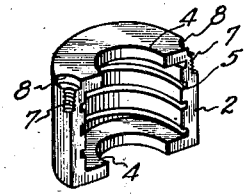
Figure 4 is a perspective view of a detail of my assembly.
Figure 5:
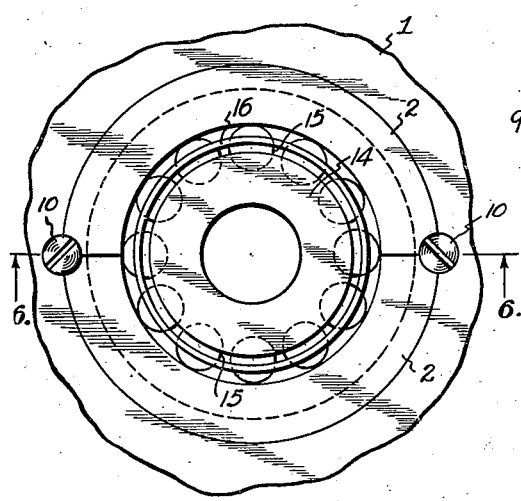
Figure 5 is a plan view of a portion of a jig or template containing a bushing according to another embodiment of my invention.
Figure 6:
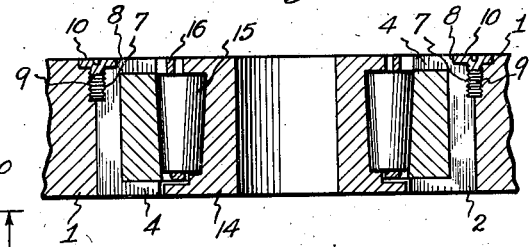
Figure 6 is a sectional view taken on a line 6—6 of Figure 5.

In the modification shown in Figures 5 and 6, the collar members 2 house a conventional ball or roller bearing in which ring 13 is the outer race and bushing 14 is the inner race. The bushing is adapted to receive the drill and is made of hardened steel as bushing 3 in the modification shown in Figure 2. The friction is minimized by rollers 15 which may be of any suitable type and held in properly spaced positions by spacer ring 16. The collar members 2 are held in position by machine screws 9 and against rotation by the heads 10 thereof, situated in holes drilled as pointed out above.

It will be understood that, while I have shown only one bushing, any number of bushings may be used in predetermined positions in a jig of any suitable character.

It will be observed that I have accomplished the objects of my invention. I have provided a bushing which will minimize the wear to such an extent that it may be used indefinitely while retaining high accuracy of work. If desired, the bushings 3 and 14 may be provided with elongated portions bracing the drill against bending for a greater length.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

For example, my device may be provided with a plurality of different bushing members 3 and 14 having different internal diameters so that, if drills or reamers of different sizes are to be used, a bushing of corresponding diameter may be readily placed in the jig.

Having thus described my invention, what I claim is:

1. In a jig provided with an opening, a stationary, longitudinally split bearing sleeve having terminal inwardly extending flanges, means for securing said sleeve in said opening for ready detachment and a guide sleeve interchangeably and rotatably carried by said bearing sleeve and restrained from longitudinal movement by said flanges.

2. A jig as in claim 1 wherein said securing means comprises a screw, threaded partly in said stationary bearing sleeve and partly in said jig.

3. A jig as in claim 1 wherein said rotatably carried guide sleeve is provided with rolling friction-reducing means.

WILLIS F. CHESLEY.